United States Patent [19]

Kumura et al.

[11] 3,909,218

[45] Sept. 30, 1975

[54] GAS SEPARATING APPARATUS

[75] Inventors: Shoji Kumura, Tokyo; Masayoshi Ohno, Yokohama; Haruhiko Ohya, Tokyo, all of Japan

[73] Assignee: Tokyo Shibaura Electric Co., Ltd., Japan

[22] Filed: Feb. 22, 1973

[21] Appl. No.: 334,837

[30] Foreign Application Priority Data
Feb. 29, 1972 Japan................................ 47-20978

[52] U.S. Cl....................................... 55/158; 55/66
[51] Int. Cl............................................ B01d 53/22
[58] Field of Search ................. 55/16, 66, 158, 159; 210/321

[56] References Cited
UNITED STATES PATENTS

| | | | |
|---|---|---|---|
| 2,609,059 | 9/1952 | Benedict | 55/16 |
| 3,212,498 | 10/1968 | McKirdy et al. | 210/321 |
| 3,244,763 | 4/1966 | Cahn | 55/16 |
| 3,274,750 | 9/1966 | Robb | 55/66 |
| 3,523,408 | 8/1970 | Rosenberg | 55/159 |
| 3,735,559 | 5/1973 | Salemme | 55/16 |

*Primary Examiner*—Charles N. Hart
*Attorney, Agent, or Firm*—Oblon, Fisher, Spivak, McClelland & Maier

[57] ABSTRACT

A gas separating apparatus is disclosed which includes a pair of gas separation areas which respectively include membranes having specific gas permeation coefficients. The gas permeation properties of the membranes are opposed to each other with respect to specific gases included in a gas mixture. Mixed gases are introduced into the gas separation areas and penetrate through different membranes resulting in gas separation. The separated gases are then exhausted separately through outlets respectively connected to collecting areas associated with corresponding membranes.

4 Claims, 6 Drawing Figures

GAS SEPARATING APPARATUS

BACKGROUND OF THE INVENTION

1. Field of the Invention

The present invention relates generally to a gas separating apparatus, and more particularly to a gas separating apparatus using membranes for separating specific gases from a plurality of mixed gases.

2. Description of the Prior Art

In a Fast Breeder Reactor using liquid sodium as its coolant, an atmosphere of an inert gas such as Argon is maintained within the reactor to cover the liquid sodium for preventing leakage of fission products.

As is well known, fission products such as radioactive Xenon (Xe), Kripton (Kr), and the like, are generated during reactor operation, and are mixed with the inert gas. When it is required to remove the cover gas and add a new one or a fresh quantity of the same gas, the fission products or fission gases should be separated from the inert gas to permit its reuse, and then the fission products should be stored in a reservoir until their radioactivity is reduced to a desired low level.

In the past, in order to separate the fission products from the inert gas, charcoal gas absorbers and super cold separation systems using the difference in the liquefaction temperatures of the gases were used.

However, charcoal gas absorbers for use with atomic power reactors generally must be extremely large, and as a result are extremely expensive to fabricate. Similarly, super cold separation systems required a complicated, large volume and expensive gas freezing system.

SUMMARY OF THE INVENTION

It is therefore one object of this invention to provide a new, improved and unique gas separating apparatus having none of the defects described above.

Another object of this invention is to provide a gas separating apparatus in which a pair of membranes having different gas permeation properties, respectively, are used in a gas separator.

A further object of this invention is to provide a gas separating apparatus in which mixed gases can be separated from each with high purity using a pair of membranes.

A still further object of this invention is to provide a gas separating apparatus in which a gas separator having a pair of membranes of different diffusion and penetration properties is provided in a multistage gas separation system for the fine separation of mixed gases.

Briefly, in accordance with one aspect of the present invention, the gas separating apparatus comprises a casing having an inlet through which mixed gases are fed and a pair of outlets through which separated gases are exhausted. A first membrane means is mounted in the casing to permit one of the mixed gases to permeate therethrough, and a second membrane means is mounted in the casing facing the first membrane means, such that the mixed gases are fed between the first and second means. The second membrane means has a gas permeation property opposed to that of the first membrane means, and the second membrane means allows the other component of the mixed gases to permeate therethrough.

BRIEF DESCRIPTION OF THE DRAWINGS

A more complete appreciation of the invention will be readily obtained as the same becomes better understood by reference to the following detailed description when considered in connection with the accompanying drawings, wherein.

BRIEF DESCRIPTION OF THE PREFERRED EMBODIMENTS

Figure 1:
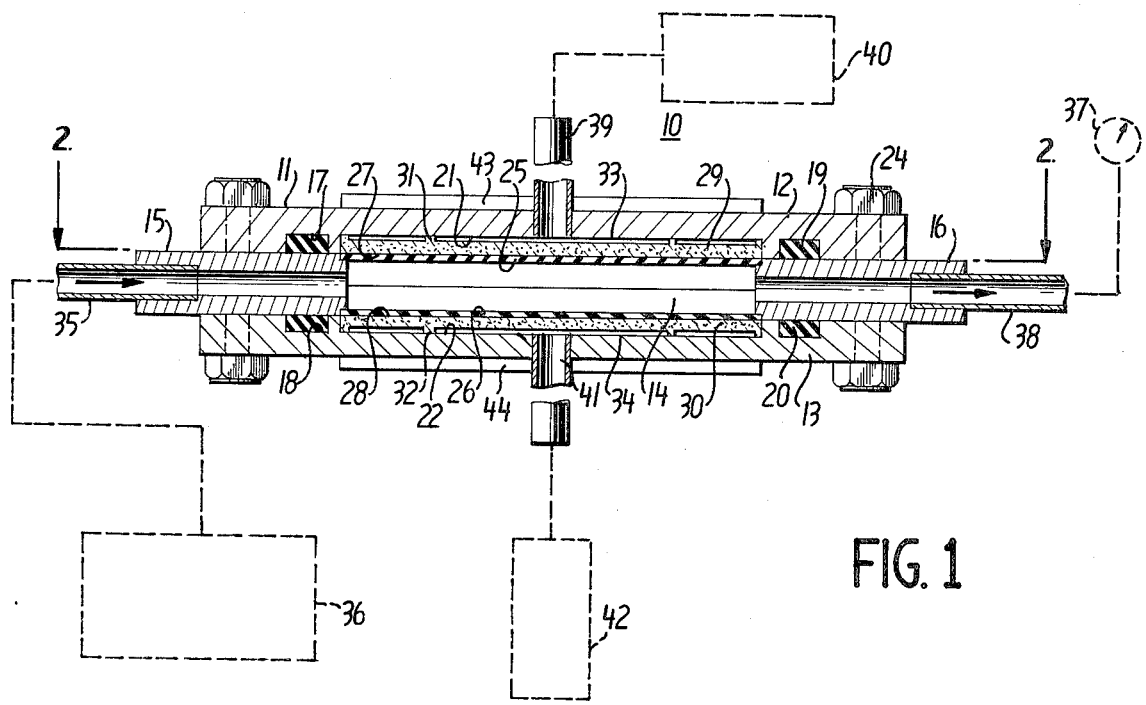
FIG. 1 is a sectional view, taken along a line 1—1 of FIG. 2 of an embodiment of a gas separating apparatus in accordance with the present invention.
Figure 2:
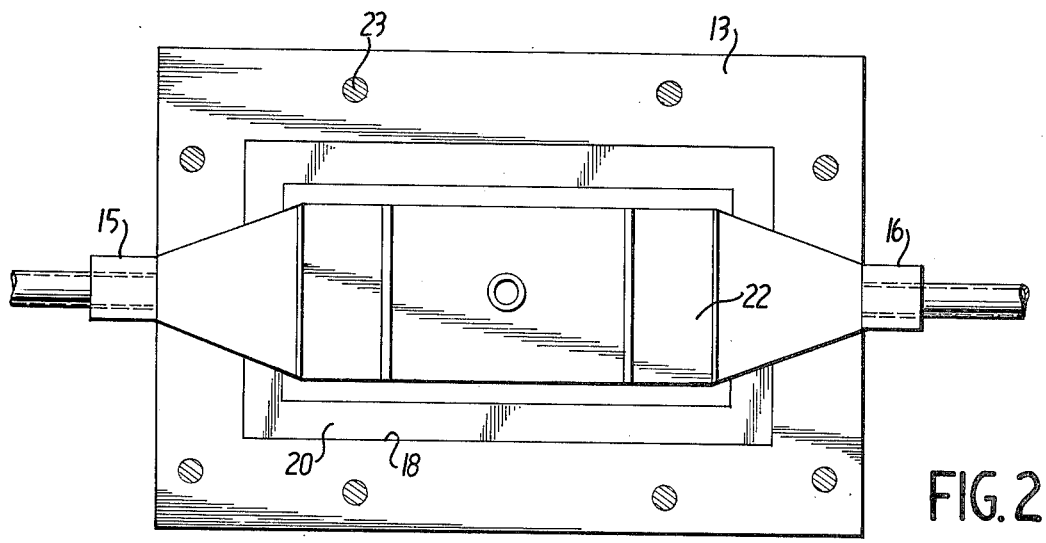
FIG. 2 is a plan view of the gas separating apparatus as shown in FIG. 1, in which the top cover is removed therefrom.

Referring now to the drawings, wherein like reference numerals designate identical or corresponding parts throughout the several views, and more particularly to FIG. 1 thereof, there is generally shown a gas separating apparatus 10, and the same comprises a casing 11 closed by a pair of cover plates 12 and 13. The casing 11 is provided with a chamber 14 therein for permitting the introduction of mixed gases to be separated, and further includes funnels 15 and 16 to form a gas inlet and a gas outlet at opposite end portions thereof. The chamber 14 is defined by hollow portions 21 and 22 of the cover plates 12 and 13. Cover plates 12 and 13 also respectively include slots 17 and 18 on their inside surfaces for retaining sealing gasket members 19 and 20 therein. For clearly illustrating the cover plate configuration, reference is made to FIG. 2, which is a plan view of the apparatus of FIG. 1 with the top cover plate 12 removed therefrom, to show the configuration of bottom cover plate 13. The hollow portion 22 has a rectangular shape surrounded by the rectangular slot 18, which is in turn filled with the rectangular gasket 20. The bottom cover plate 13 also has a plurality of through openings 23 at a peripheral portion thereof for extending fastening bolts 24 therethrough. Since the configuration of top cover plate 12 is similar to that of bottom cover plate 13, a detailed description thereof is not believed necessary.

Referring again to FIG. 1, gas permeation assemblies 25 and 26 are provided in hollow portions 21 and 22 of cover plates 12 and 13, and the same are respectively composed of a gas permeable membranes 27 and 28 and reinforcement members 29 and 30 for mounting the membranes thereon. The gas permeation assemblies 25 and 26 are of a planar, rectangular configuration so as to fit into the rectangular hollow portions 21 and 22. For convenience of gas collection, the reinforcement members 29 and 30 are respectively provided with legs 31 and 32 on rear surfaces thereof, and thus gaps 33 and 34 are defined between the rear surfaces of reinforcement members 29 and 30 and the insides of cover plates 12 and 13.

A conduit pipe 35 is screwed into an end of funnel 15 and is coupled to a mixed gas source 36, such as an exhaust gas reservoir of a Fast Breeder Reactor.

In order to measure the gas pressure in chamber 14, a gas pressure meter 37 is provided and connected to an end of funnel 16 through a conduit pipe 38 having one end screwed into the funnel 16.

A conduit pipe 39 is provided and has one end mounted through the central portion of top cover plate 12 so as to provide access to the rear surface of gas permeation assembly 25. The other end of conduit pipe 39 is coupled to gas reservoir 40 in which one kind of separated gas is stored. Similarly, a conduit pipe 41 is provided and has one end mounted through the central portion of bottom cover 13 so as to provide access to the rear surface of gas permeation assembly 26. The other end of conduit pipe 41 is coupled to gas reservoir 42 in which the other kind of separated gas is stored.

It is assumed that the mixed gases in gas source 36 include Argon and Xenon. In this case, the membrane 27 is made of cellulose acetate, while the membrane 28 is made of silicone rubber. The cellulose acetate membrane is easily permeable by Argon gas, but the Xenon gas cannot pass through the cellulose acetate membrane. On the other hand, the membrane 28 of silicon rubber is easily permeable by Xenon gas, but the Argon gas cannot be passed through the silicone rubber. Thus, when mixed gases are introduced into chamber 14, Argon gas permeates through membrane 27 and reinforcement member 29 which is made of a porous ceramic material, and enters into gap 33. It is then fed into the reservoir 40 through conduit 39. On the other hand, the Xenon gas permeates through membrane 28 and reinforcement member 30 which is also made of a porous ceramic material, and enters into gap 34. It is then fed into the reservoir 42 through conduit 41.

As an example, a film of cellulose acetate having a thickness of 0.25 mm has been employed as the membrane 27, and a film of silicone rubber having a thickness of 0.21 mm has been employed as the membrane 28. In this case, the pressure of mixed gases being introduced into chamber 14 has been chosen in a range from 5 kg/cm$^2$ to 20 kg/cm$^2$, which the membranes 27 and 28 could resist without rupturing because of the existence of reinforcement members 29 and 30.

If there is a single membrane of cellulose acetate for permeation of Argon gas, Xenon gas will remain in front of the membrane to increase the pressure in front of the membrane. As a result concentration of Argon in the mixed gases will be decreased in front of the membrane. In accordance with the invention, since there are two membranes 27 and 28 which face each other and which are opposed to each other in gas permeation properties the Xenon and Argon separately permeate through the corresponding membranes to remove the gas pressure rising in front of the membranes.

The following tables show several experimental results where the components of mixed gases are different from each other. In each table A shows a membrane made of cellulose acetate of a thickness of 0.25 mm and an area of 12.4 cm$^2$ and freeze-dried after heat treatment at 80°C; B shows a membrane made of cellulose acetate of a thickness of 0.25 mm, and an area of 12.4 cm$^2$ and freeze-dried without heat treatment; and C shows a membrane made of silicone rubber, consisting of Dimethyl siloxane and also of 0.21 mm thickness and an area of 12.4 cm$^2$.

TABLE 1

ARGON AND XENON

| Feed Gas condition | | | | | Gas obtained from conduit 39 | | | | Gas obtained from conduit 41 | | |
|---|---|---|---|---|---|---|---|---|---|---|---|
| Pressure (Atm.) | Temp. (°C) | Feed gas components (%) | | Membrane | Gas components (%) | | Gas flow quantity c.c./min | Membrane | Gas component (%) | | Gas flow quantity c.c./min |
| | | Ar | Xe | | Ar | Xe | | | Ar | Xe | |
| 20 | 25 | 95.5 | 4.5 | A | 98.2 | 1.8 | 0.5 | C | 90.8 | 9.2 | 2.0 |
| 10 | '' | '' | '' | A | 98.1 | 1.9 | 1.1 | C | 89.1 | 10.9 | 4.0 |
| 5 | '' | '' | '' | A | 97.9 | 2.1 | 2.2 | C | 88.5 | 11.5 | 7.5 |
| 20 | '' | '' | '' | B | 96.8 | 3.2 | 1.0 | C | 90.8 | 9.2 | 2.0 |
| 10 | '' | '' | '' | B | 96.7 | 3.8 | 2.0 | C | 89.1 | 10.9 | 4.0 |
| 5 | '' | '' | '' | B | 96.6 | 8.4 | 4.1 | C | 88.5 | 11.5 | 7.5 |

TABLE 2

HELIUM AND ARGON

| Feed gas condition | | | | | Gas obtained from conduit 39 | | | | Gas obtained from conduit 41 | | |
|---|---|---|---|---|---|---|---|---|---|---|---|
| Pressure (Atm.) | Temp. (°C) | Feed gas components (%) | | Membrane | Gas components (%) | | Gas flow quantity c.c./min | Membrane | Gas component (%) | | Gas flow quantity c.c./min. |
| | | Ar | Xe | | Ar | Xe | | | Ar | Xe | |
| 5 | 25 | 87.0 | 13.0 | A | 98.6 | 1.4 | 8.0 | C | 78.7 | 21.3 | 1.63 |
| 10 | '' | '' | '' | A | 98.2 | 1.8 | 16.0 | C | 81.1 | 18.9 | 3.05 |
| 20 | '' | '' | '' | A | 98.2 | 1.8 | 30.0 | C | 82.4 | 17.6 | 5.60 |
| 5 | '' | 80.0 | 70.0 | A | 40.0 | 60.0 | 8.5 | C | 27.8 | 72.2 | 2.08 |
| 10 | '' | '' | '' | A | 44.0 | 56.0 | 7.0 | C | 26.7 | 73.3 | 4.00 |
| 20 | '' | '' | '' | A | 57.0 | 43.0 | 14.0 | C | 26.4 | 73.6 | 7.50 |

TABLE 3

ARGON, XENON AND KRIPTON

| Feed gas condition | | | | | | Gas obtained from conduit 39 | | | | Gas obtained from conduit 41 | | | |
|---|---|---|---|---|---|---|---|---|---|---|---|---|---|
| Pressure (Atm.) | Temp. (°C) | Feed gas components (%) | | | Membrane | Gas components (%) | | | Gas flow quantity c.c./min. | Membrane | Gas component (%) | | | Gas flow quantity c.c./min. |
| | | Ar | Kr | Xe | | Ar | Kr | Xe | | | Ar | Kr | Xe | |
| 10 | 25 | 94.5 | 3.0 | 2.5 | A | 97.3 | 1.7 | 1.0 | 1.1 | C | 85.0 | 5.0 | 10.0 | 8.8 |

TABLE 4

ARGON AND KRIPTON

| Feed gas condition | | | | | Gas obtained from conduit 39 | | | | Gas obtained from conduit 41 | | | |
| --- | --- | --- | --- | --- | --- | --- | --- | --- | --- | --- | --- | --- |
| Pressure | Temp. | Feed gas component (%) | | Membrane | Gas component (%) | | Gas flow quantity c.c./min | Membrane | Gas component (%) | | Gas flow quantity c.c./min. |
| (Atm.) | (°C) | Ar | Kr | | Ar | Kr | | | Ar | Kr | |
| 5 | 25 | 98.0 | 2.0 | A | 98.8 | 1.2 | 0.5 | C | 96.6 | 3.4 | 1.8 |
| 10 | " | " | " | A | 98.9 | 1.1 | 1.2 | C | 96.4 | 3.6 | 3.9 |
| 20 | " | " | " | A | 99.1 | 0.9 | 2.3 | C | 96.0 | 4.0 | 8.0 |

TABLE 5

HELIUM AND OXYGEN

| Feed gas condition | | | | | Gas obtained from conduit 39 | | | | Gas obtained from conduit 41 | | |
| --- | --- | --- | --- | --- | --- | --- | --- | --- | --- | --- | --- |
| Pressure | Temp. | Feed gas component (%) | | Membrane | Gas components (%) | | Gas flow quantity c.c./min | Membrane | Gas component (%) | | Gas flow quantity c.c./min |
| (Atm.) | (°C) | He | $O_2$ | | He | $O_2$ | | | He | $O_2$ | |
| 10 | 25 | 22.0 | 78.0 | A | 39.4 | 60.6 | 1.6 | C | 13.3 | 86.7 | 4.0 |

TABLE 6

HELIUM AND METHANE

| Feed gas condition | | | | | Gas obtained from conduit 39 | | | | Gas obtained from conduit 41 | | |
| --- | --- | --- | --- | --- | --- | --- | --- | --- | --- | --- | --- |
| Pressure | Temp. | Feed gas component (%) | | Membrane | Gas component (%) | | Gas flow quantity c.c./min. | Membrane | Gas component (%) | | Gas flow quantity c.c./min. |
| (Atm.) | (°C) | H | $CH_4$ | | He | $CH_4$ | | | He | $CH_4$ | |
| 10 | 25 | 33.0 | 67.0 | A | 66.0 | 34.0 | 15 | C | 15.0 | 85.0 | 7.0 |

TABLE 7

HYDROGEN AND METHANE

| Feed gas condition | | | | | Gas obtained from conduit 39 | | | | Gas obtained from conduit 51 | | |
| --- | --- | --- | --- | --- | --- | --- | --- | --- | --- | --- | --- |
| Pressure | Temp. | Feed gas component (%) | | Membrane | Gas component (%) | | Gas flow quantity c.c./min. | Membrane | Gas component (%) | | Gas flow quantity c.c./min. |
| (Atm.) | (°C) | $H_2$ | $CH_4$ | | $H_2$ | $CH_4$ | | | $H_2$ | $CH_4$ | |
| 10 | 25 | 26.0 | 74.0 | A | 48.0 | 52.0 | 14.0 | C | 20.0 | 80.0 | 8.0 |

From the above tables, it is clearly understood that the gas separating apparatus 10 of FIG. 1 shows a high gas separation efficiency. The gas separation efficiency can be further elevated by increasing the feed gas pressure.

The gas separation efficiency may also be controlled by temperature control of the feed gas or gas permeation assemblies 25 and 26. In order to control the temperatures of the gas permeation assemblies 25 and 26, electric heaters 43 and 44 are mounted on cover plates 12 and 13 respectively so that the gas permeation assemblies 25 and 26 can be separately heated to desired temperatures.

Although only one gas separating apparatus 10 is shown in FIG. 1, a plurality of gas separating apparatuses can be connected in series for further purification of the separated gas.

Figure 3:
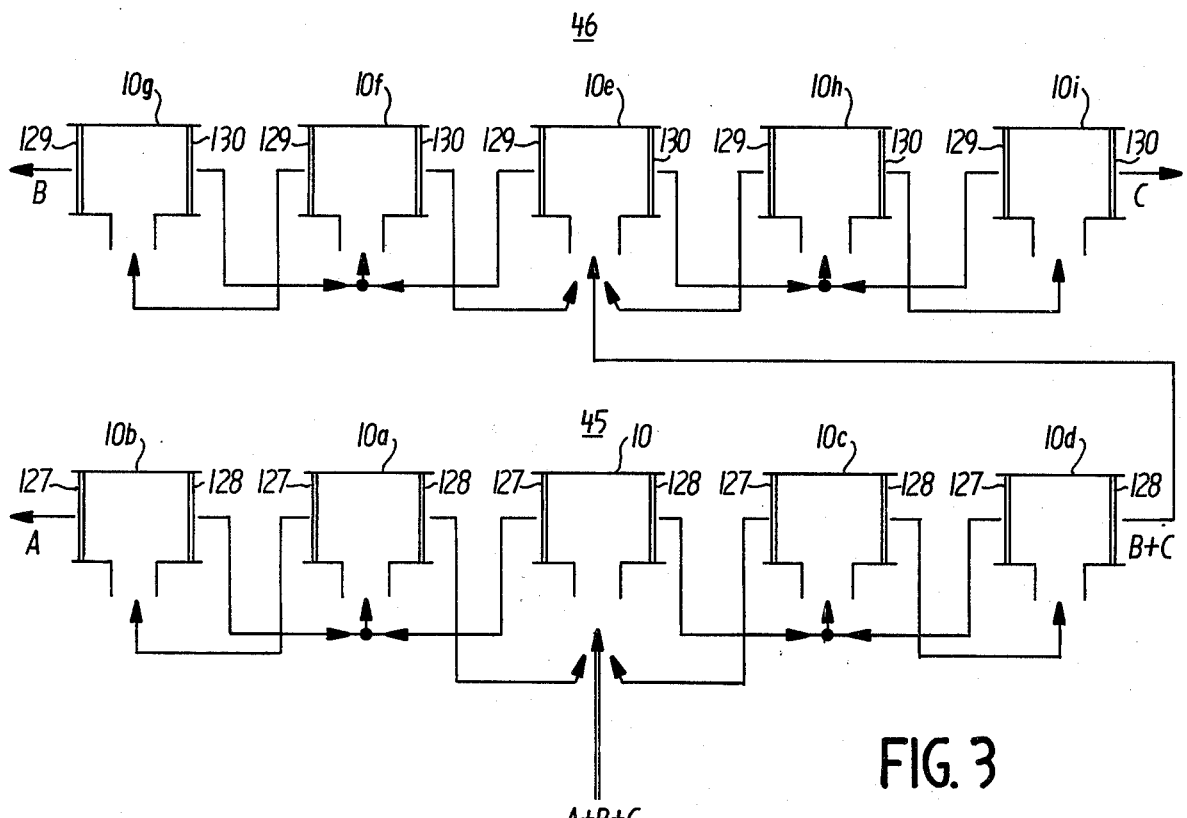
FIG. 3 is a schematic diagram of a gas separating system having a plurality of gas separators connected in cascade relation.

FIG. 3 shows a gas separating system in which a mixed gas including three components A, B and C is separated into its respective components. The gas separating system is composed of two stages 45 and 46, one of which includes five gas separating apparatuses 10, 10a, 10b, 10c and 10d, and other of which also includes five gas separating apparatuses 10e, 10f, 10g, 10h and 10i. The gas separating apparatuses 10, 10a, 10b, 10c, 10d, 10e, 10f, 10g, 10h and 10i respectively have the same construction as that of FIG. 1, except for a difference in membranes.

The mixed gas including components A, B and C is fed first into the chamber of gas separating apparatus 10, and A component permeates through membrane 127 and other components B and C permeate through membrane 128. The component A permeated through membrane 127, which may include small quantities of B and C, is fed into the chamber of gas separating apparatus 10a, and then the A component permeated through the membrane 127 of separating apparatus 10a is fed into the chamber of gas separating apparatus 10b for further purification, and finally permeates through membrane 127 of gas separating apparatus 10b. Thus the purified component A is taken out of gas separating apparatus 10b. The components B and C permeated through the membrane 128 of gas separating apparatus 10a are returned to the inlet of gas separating apparatus 10, and similarly, the components B and C permeated through membrane 128 of gas separating apparatus 10b are returned to the inlet of the preceding gas separating apparatus 10a.

A similar gas separating function is carried out in gas separating apparatuses 10c and 10d, and separated gases B and C are taken out through membrane 128 of gas separating apparatus 10d. The component A permeated through membrane 127 of gas separating apparatuses 10c and 10d is returned to the chamber of the preceding gas separating apparatuses 10c and 10 respectively.

Separated gas components B and C are then introduced into the chamber of gas separating apparatus 10e provided in the second stage 46. The membrane 129 of gas separating apparatuses 10e and 10i are made to permit the component B to permeate therethrough, while the membranes 130 of gas separating apparatuses 10e and 10i are made to permit the component C easily pass therethrough. The gas feeding paths and return paths are made similarly to those of first stage 45. Thus the purified component B can be taken from the gas separating apparatus 10g through membrane 129 thereof, and the component C can be taken from the gas separating apparatus 10i through membrane 130 thereof. In this way, the three components A, B and C of the mixed gas can be separated from one another.

Figure 4:
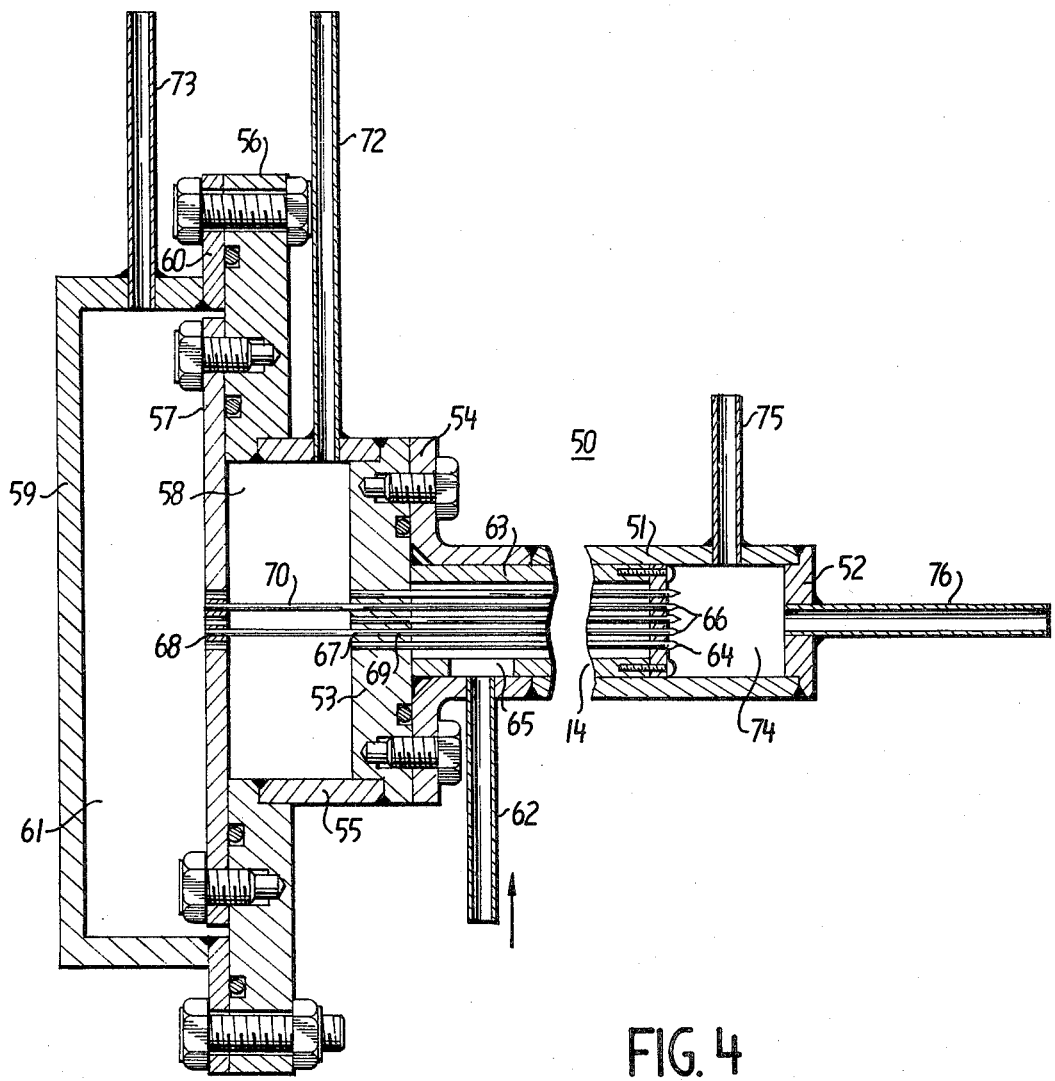
FIG. 4 shows a sectional view of another embodiment of a gas separating apparatus in accordance with the present invention.

Another embodiment of the invention is illustrated in FIG. 4 wherein a gas separating apparatus is generally referenced with a numeral 50, and includes a cylindrical tube member 51 closed at one end thereof with an end plate 52. The other end of the same tube member 51 is closed by an end plate 53 which is in turn secured to a flanged portion 54 of the tube member 51. A cylindrical collar 55 is welded at one end around the end plate 53 and a supporting member 56 is welded around the other end of collar 55. A partition wall member 57 is provided for closing a central opening in the supporting member 56. In this way, a first gas collection chamber 58 is defined by end plate 53, collar 55, supporting member 56 and partition wall member 57.

A cup-like cover 59 is mounted on the supporting member 56 at a flanged portion 60 thereof so that a second gas collection chamber 61 is defined by the two members 57 and 59. A gas feed conduit 62 is provided through the wall of cylindrical tube member 51 for feeding mixed gases into the chamber 14 of the cylindrical tube member 51 from a mixed gas source (not shown).

A cylindrical tube member 63 is inserted into the cylindrical tube member 51 and has one end welded to end plate 53 and the other end closed by a perforated plate 64. The tube member 63 also has an opening 65 through which the mixed gases are fed into chamber 14. Numerous perforations 66, 67 and 68 are respectively provided through the perforated plate 64, the end plate 53 and wall member 57. These sets of perforations 66, 67 and 68 are aligned with each other for the reason described hereinbelow.

There are provided two groups of hollow fibers 69, and 70 which extend from the perforated plate 64, end plate 53 and wall member 57 such that one group of hollow fibers 69 extends through the two sets of perforations 66 and 67, and the other group of hollow fibers 70 extends through the three sets of perforations 66, 67 and 68.

Figure 5:
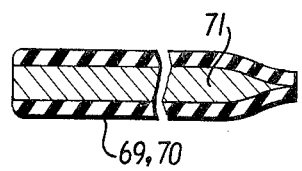
FIG. 5 shows a sectional view of a hollow fiber, shown in an enlarged scale and partly cut away, for use in the embodiment of FIG. 4.

A single one of the hollow fibers 69 and 70 is shown in FIG. 5 with an enlarged scale, and is closed at one end thereof by any suitable sealing method, for example, by welding. The hollow fibers 69 and 70 have a diameter of 1 mm and a wall thickness of 0.25 mm, for example. Thus when the hollow fibers 69 and 70 are made of such suitable materials as described in the embodiment of FIG. 1, the wall of the hollow fibers 69 and 70 function as a membrane capable of permeation by a selected gas.

As stated above, one group of hollow fibers 69 is mounted through perforations 66 of perforated plate 64 and perforations 67 of end plate 53, and the bottom or open end of the same is located at perforated plate 64 so that the opening thereof communicates with the first gas collection chamber 58.

The other hollow fibers 70 are mounted between perforations 66 of perforated plate 64 and perforations 68 in wall member 57, and thus pass completely through perforations 67 of end plate 53, so that the bottom or open ends of the same are similarly positioned at perforated plate 68 and the openings thereof communicate with the second gas collection chamber 61.

The hollow fibers 69 or 70 are reinforced by any suitable core 71, inserted therein, of a material such, for example, as glass, rock-wool, copper, nickel, titanium, aluminium and the alloys thereof, hemp, cotton, silk, wool, yarn of synthetic resin, ceramics and the like. The core 71 may be formed by either wire or granules of the above material. It is noted that the core 71 inserted into the hollow fibers 69 or 70 should be porous to allow the gas to easily pass therethrough.

For convenience of explanation, it is assumed that the shorter hollow fibers 69 are made of silicone rubber to permit Xenon gas to permeate through the wall or membrane thereof, and that the longer hollow fibers 70 are made of Cellulose Acetate to permit Argon gas to permeate through the wall or membrane thereof. In this way, the mixed gases are fed into chamber 14 through the gas feed conduit 62. The Xenon gas permeates through the outer walls of hollow fibers 69 into the interior thereof, and then the permeated Xenon gas flows along the hollow fibers 69 in a leftward direction and is collected in the first gas collection chamber 58. The Xenon gas collected in chamber 58 is then fed into a gas reservoir (not shown) through a conduit pipe 72 attached to the cylindrical collar 55. Similarly, the Argon gas permeates through the outer walls of hollow fibers 70 into the interior thereof, and then the permeated Argon gas flows along the hollow fiber 70 in the leftward direction and is collected in the second gas collection chamber 61. The Argon gas collected in chamber 61 is then fed into a gas reservoir (not shown) through a conduit pipe 73 attached to the partition wall member 59.

The mixed gases that could not permeate through the walls of hollow fibers 69 and 70 are then collected in a space 74 of the cylindrical tube member 51 and returned to the mixed gas source (not shown) through a conduit pipe 75 attached to the member 51 for recirculation. The cylindrical tube member 51 is provided with a conduit pipe 76 having one end attached to the end plate 52. The other end of pipe 76 is connected to a pressure gauge (not shown) to indicate the gas pressure in the chamber 14.

In accordance with the embodiment of FIG. 4, since numerous hollow fibers 69 and 70 have been employed as the membrane, the total surface area of membrane in the form of hollow fibers 69 and 70 can be increased substantially to permit large quantities of gas flow to permeate through the walls of hollow fibers 69 and 70 under a selected high pressure which, in turn, causes the gas permeation rate to increase. Thus, a great amount of mixed gas flow can be separated in a unit time. The core or filler 71 in the hollow fibers 69 and 70 prevents the hollow fibers from collapsing or closing off the gas flow path when the hollow fibers 69 and 70 are bent.

Figure 6:
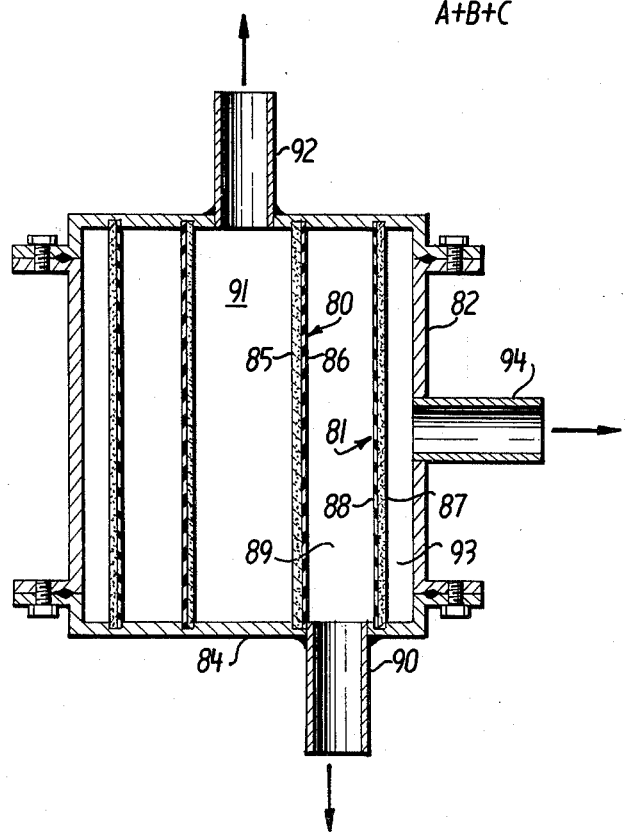
FIG. 6 is a sectional view of a further embodiment of a gas separating apparatus in accordance with the present invention.

In a further embodiment of the invention shown in FIG. 6, a pair of cylindrical membrane assemblies 80 and 81 are concentrically arranged in a cylindrical outer casing 82. The opposite ends of outer casing 82 are closed by cover plates 83 and 84.

The cylindrical membrane assembly 80 is positioned at the inside of the cylindrical membrane assembly 81 and includes a porous ceramic cylinder 85 and a membrane 86 surrounding the ceramic cylinder 85. The membrane assembly 81 includes a porous ceramic cylinder 87 and a membrane 88 attached to the inside of the ceramic cylinder 87.

The mixed gases to be separated are introduced into a space 89 between the membrane assemblies 80 and 81 through a conduit pipe 90 mounted on the lower cover plate 84, and then one component of the mixed gases radially permeates through the membrane assembly 80 and is collected in a chamber 91 thereof. The gas collected in chamber 91 is then fed into a gas reservoir (not shown) through a conduit pipe 92 mounted on the upper cover plate 83. Similarly, the other component of the mixed gases radially permeates through membrane assembly 81 and is collected in a chamber 93 provided between the outer wall of casing 82. The gas collected in chamber 93 is then fed into a gas reservoir (not shown) through a conduit pipe 94 mounted on the outside wall of casing 82.

The gas separation is made in a manner similar to that of the embodiment of FIG. 1. In the FIG. 6 embodiment, since membranes 86 and 88 are located in a space 89 in which the mixed gases are fed under pressure, the breakdown of the membranes 86 and 88 can be effectively prevented.

Obviously, numerous modifications and variations of the present invention are possible in light of the above teachings. It is therefore to be understood that within the scope of the appended claims the present invention may be practiced otherwise than as specifically described herein.

What is claimed as new and desired to be secured by Letters Patent of the United States is:

1. A gas separating apparatus comprising:
a casing having an inlet through which mixed gases are fed under relative pressure and a pair of outlets through which separated gases are exhausted, respectively;
a first membrane means mounted in said casing to permit one component of said mixed gases to permeate therethrough; and
a second membrane means mounted in said casing facing said first membrane means such that said mixed gases are fed between said first and second means, said second membrane means having a gas permeation property opposed to that of said first membrane means, and said second membrane means allowing the other component of mixed gases to permeate therethrough;
said casing being composed of a pair of cover plates overlapped upon each other each of which has a hollow or recessed portion for respectively mounting said membrane assemblies therein;
gas collection chambers being respectively defined within said recessed portions of said casing between said membrane assemblies and said cover plates and being fluidically connected with said pair of outlets, respectively, for collecting said permeated and separated gases therein and for exhausting said gases therefrom;
said membrane assemblies being composed of a flat type porous ceramic plate and a film like membrane mounted upon one surface of said ceramic plate, the rear surface of said ceramic plate having legs projecting therefrom against said hollow portion of said cover plate so as to define said gas collection chamber therebetween.

2. A gas separating apparatus comprising:
a casing having an inlet through which mixed gases are fed and a pair of outlets through which separated gases are exhausted, respectively;
a first membrane means mounted in said casing to permit one component of said mixed gases to permeate therethrough; and
a second membrane means mounted in said casing facing said first membrane means such that said mixed gases are fed between said first and second means, said second membrane means having a gas permeation property opposed to that of said first membrane means, and said second membrane means allowing the other component of said mixed gases to permeate therethrough;
said first and second membrane means being respectively comprised of first and second groups of hollow fibers arranged parallel to each other, one end of all of said hollow fibers being closed off, said second group of hollow fibers being longer than said first group of hollow fibers, and one component of mixed gases being permitted to permeate through the walls of said first group of hollow fibers to be collected in a first collection chamber, and another component of mixed gases being permitted to permeate through the walls of said second group of hollow fibers to be collected in a second collection chamber, said mixed gased being fed into a space between said first and second groups of hollow fibers, and separated gases being taken out of said first and second collection chambers respectively.

3. A gas separating apparatus according to claim 2 wherein:
a porous core formed of wire is inserted into all of said hollow fibers for reinforcement without prevention of gas flow.

4. A gas separating apparatus according to claim 2 wherein:
a porous core formed of granular material is inserted in all of said hollow fibers for reinforcement thereof without prevention of a gas flow.

* * * * *